US007714059B2

(12) United States Patent
Sugimoto

(10) Patent No.: US 7,714,059 B2

(45) Date of Patent: May 11, 2010

(54) CLEANING BLADE FOR USE IN IMAGE-FORMING APPARATUS

(75) Inventor: Mutsuki Sugimoto, Hyogo (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

(21) Appl. No.: 11/519,918

(22) Filed: Sep. 13, 2006

(65) Prior Publication Data

US 2007/0078218 A1 Apr. 5, 2007

(30) Foreign Application Priority Data

Oct. 4, 2005 (JP) ............................ 2005-291413

(51) Int. Cl.
*C08K 3/04* (2006.01)
*C08F 36/00* (2006.01)
*C08F 12/28* (2006.01)

(52) U.S. Cl. ........................ 524/495; 526/335; 526/310

(58) Field of Classification Search ................ 524/495; 526/335, 310
See application file for complete search history.

(56) References Cited

U.S. PATENT DOCUMENTS 5,065,158 A * 11/1991 Nojima et al. ................ 347/33
5,604,573 A * 2/1997 Endo et al. .................... 399/55
7,358,314 B2 * 4/2008 Gajiwala et al. ............ 526/335
2004/0266938 A1 * 12/2004 Tokumitsu et al. .......... 524/495

FOREIGN PATENT DOCUMENTS

| | | |
|---|---|---|
| JP | 01-093761 | 4/1989 |
| JP | 04-311988 | 11/1992 |
| JP | 05-024049 A | 2/1993 |
| JP | 06-167825 | 6/1994 |
| JP | 08-328351 | 12/1996 |
| JP | 10-017718 A | 1/1998 |
| JP | 10-213971 | 8/1998 |
| JP | 2003-103686 A | 4/2003 |
| JP | 2003-226773 | 8/2003 |
| JP | 2003-248404 | 9/2003 |
| JP | 2004-037739 | 2/2004 |

* cited by examiner

*Primary Examiner*—William K Cheung
(74) *Attorney, Agent, or Firm*—Birch, Stewart, Kolasch & Birch, LLP.

(57) ABSTRACT

A cleaning blade, for use in an image-forming apparatus, formed by a molded resin composition containing a rubber component consisting of a thermosetting elastomer containing acrylonitrile as a constituent monomer thereof and having a bound acrylonitrile amount of 15 to 50%.

2 Claims, 2 Drawing Sheets

CLEANING BLADE FOR USE IN IMAGE-FORMING APPARATUS

This nonprovisional application claims priority under 35 U.S.C. § 119(a) on Patent Application No(s). 2005-291413 filed in Japan on Oct. 4, 2005, the entire contents of which are hereby incorporated by reference.

FIELD OF THE INVENTION

The present invention relates to a cleaning blade for use in an image-forming apparatus and more particularly to a cleaning blade that is preferably used at a low temperature.

In an electrostatic photocopying machine in which ordinary paper is used as recording paper, a copying operation is performed as follows: an electrostatic charge is applied to the surface of an photoreceptor by discharge, an image is exposed to the photoreceptor to form an electrostatic latent image thereon, toner having an opposite polarity is attached to the electrostatic latent image to develop the electrostatic latent image, a toner image is transferred to recording paper, the recording paper to which the toner image has been transferred is heated under pressure to fix the toner to the recording paper.

Therefore to sequentially copy the image of an original document on a plurality of sheets of recording paper, it is necessary to remove the toner which has remained on the surface of the photoreceptor after the toner image is transferred to the recording paper from the photoreceptor in the above-described processes. As a method of removing the toner, a cleaning method of sliding a cleaning blade on the surface of the photoreceptor, with the cleaning blade pressed against the surface of the photoreceptor is known.

Blades made of elastic materials made of polyurethane or the like are much used as the cleaning blade for use in the image-forming apparatus. But the cleaning blade made of the elastic materials has the following problems:

(1) A noise-making phenomenon is liable to occur owing to vibrations caused by sliding contact between the cleaning blade and the photoreceptor at a high temperature and a high humidity.

(2) The cleaning blade is disposed counter to the photoreceptor. Thus a reversal phenomenon that the edge of the cleaning blade is moved in the rotational direction of the photoreceptor is liable to occur in a region having a small amount of residual toner.

(3) Because very fine spherical toner has been recently developed to form a high-quality image, it is difficult to remove the toner that has remained on the surface of the photoreceptor, unless the cleaning blade is strongly pressed against the surface of the photoreceptor. Thus a defective cleaning is liable to be performed.

(4) The cleaning blade chatters and is pressed against the photoreceptor at a small force owing to a change of properties of the material of the cleaning blade at a low temperature and a low humidity. Thus a defective cleaning is liable to be performed.

To prevent the occurrence of the noise-making phenomenon and the reversal phenomenon, the following improvements have been conventionally made: The surface of the cleaning blade is coated, secondary members are processed on the surface of the cleaning blade, and a lubricant for decreasing the friction coefficient of the photoreceptor is applied to the surface thereof.

But the processing of the surface of the cleaning blade causes the number of manufacturing processes to be increased, thereby increasing the manufacturing cost of the cleaning blade and deteriorating the accuracy of the surface of the cleaning blade. The application of the lubricant to the surface of the photoreceptor necessitates a lubricant-applying apparatus to be mounted in the image-forming apparatus. Thereby there is an increase in the number of parts and hence in the manufacturing cost.

More specifically, in Japanese Patent Application Laid-Open No. 2003-103686 (patent document 1), there is disclosed a cleaning blade, made of polyurethane rubber, which has a layer formed on the edge thereof by a plasma chemical gas phase evaporation method. The layer is made of flexible diamond-like carbon. According to the disclosure, the cleaning blade is allowed to have a low friction coefficient and an excellent wear resistance without deteriorating the property of the elastic body composing the base material.

The cleaning blade is allowed to have a low friction coefficient owing to the layer made of the flexible diamond-like carbon. Further the noise-making phenomenon which occurs owing to vibration caused by the sliding contact between the photoreceptor and the cleaning blade is suppressed. But the flexible diamond-like carbon is attached to only the edge of the cleaning blade. Thus the degree of the durability and wear resistance of the cleaning blade are not-sufficiently high in putting the cleaning blade into practical use. Another problem of the cleaning blade is that it is necessary to carry out the plasma chemical gas phase evaporation method to form the flexible diamond-like carbon layer on the elastic body composing the base material. Thus it is necessary to manage the complicated manufacturing process and hence the manufacturing cost is high.

To solve the above-described problem, there is a proposal made to improve the composition constructing the cleaning blade.

For example, in the disclosure made in Japanese Patent Application Laid-Open No. 5-24049 (patent document 2), polyisocyanate and a part of polyol are allowed to react with each other to form a prepolymer, and the remaining polyol and a hardening agent are added to the prepolymer to cast and crosslink the mixture. According to the disclosure, it is possible to reduce a strain amount due to inclination without decreasing the mechanical property of the composition such as the hardness and strength and the low temperature characteristic thereof. Thus the obtained cleaning blade for use in an electrophotographic copying machine is durable.

Only the glass transition temperature Tg of the hardened urethane is described in the "example" of the specification of the patent document 2, and the cleaning performance of the cleaning blade at a low temperature is not evaluated. The polyurethane rubber having the glass transition temperature Tg not less than 0° C. is unfavorable in its low-temperature characteristic. Therefore in the invention described in the patent document 2, no improvement is made on the low-temperature characteristic of the cleaning blade for use in the electrophotographic copying machine.

In Japanese Patent Application Laid-Open No. 10-17718 (patent document 3), there is disclosed (described in claim 1 and paragraph [0053]) a member, composed of a semiconductive elastomer, which can be used as a cleaning blade for use in an image-forming apparatus. The member composed of the semiconductive elastomer contains the conductivity-imparting agent, the elastomer (a), and the elastomer (b). The elastomer (a) forms a micro-domain structure that substantially forms a continuous phase. The mixing amount of the conductivity-imparting agent contained in the elastomer (a) is more than that contained in the elastomer (b). The elastomer (a) has a higher hardness than the elastomer (b). The elastomer (a) has a compression set factor at not more than 20%, whereas the elastomer (b) has a compression set factor at not more than 50%. Nitrile rubber is described (described in paragraph [0027]) as a preferable substance of the elastomer (a).

The bound acrylonitrile amount of the nitrile rubber is not described nor suggested in the patent document 3. The member, composed of the semiconductive elastomer member, which is described in the patent document 3 (described in paragraphs [0036], [0094]) has a low hardness of 20 to 60 in JIS-A hardness. The member, composed of the semiconductive elastomer, which has a low hardness has an inferior cleaning performance. Thus it is difficult to practically use the member composed of the semiconductive elastomer as a cleaning blade.

Patent Document 1

Japanese Patent Application Laid-Open No. 2003-103686

Patent Document 2

Japanese Patent Application Laid-Open No. 5-24049

Patent Document 3

Japanese Patent Application Laid-Open No. 10-17718

SUMMARY OF THE INVENTION

The present invention has been made in view of the above-described problems. Therefore it is an object of the present invention to provide a cleaning blade which can be manufactured at a low cost in a simple process, can be restrained from generating a chatter phenomenon which occurs owing to vibrations caused by sliding contact between the cleaning blade and a photoreceptor at a low temperature and a low humidity, and is capable of securely removing toner remaining on a surface of the photoreceptor even at a low temperature.

To achieve the object, the present invention provides a cleaning blade, for use in an image-forming apparatus, formed by molding a resin composition containing a rubber component consisting of a thermosetting elastomer containing acrylonitrile as a constituent monomer thereof and having a bound acrylonitrile amount at 15 to 50%.

The present inventors have repeated various experiments and investigations on a resin composition capable of displaying desired cleaning performance at a low temperature and made the following finding.

It is possible to prevent a chatter phenomenon from occurring and the cleaning blade from being pressed at a low force against a photoreceptor at a low temperature and a low humidity by using the thermosetting elastomer containing the acrylonitrile as the constituent monomer thereof and having the bound acrylonitrile amount at 15 to 50% as the resin composition composing the cleaning blade for use in an image-forming apparatus. Consequently the cleaning blade has improved cleaning performance at a low temperature.

The reason the bound acrylonitrile amount of the thermosetting elastomer is set to 15 to 50% is because if the bound acrylonitrile amount is less than 15%, the thermosetting elastomer has a low mechanical strength. Thus the cleaning blade has low wear resistance and durability. On the other hand, if the bound acrylonitrile amount is more than 50%, the thermosetting elastomer has a high glass transition temperature Tg. Thus the cleaning blade has a low cleaning performance at a low temperature and a low humidity.

The bound acrylonitrile amount is set to more favorably 25 to 42% and most favorably 28 to 40%.

The bound acrylonitrile amount of the thermosetting elastomer can be measured in accordance with the method described in JIS K 6384. Since the bound acrylonitrile amount is indicated on products commercially available, products having the bound acrylonitrile amount specified in the present invention should be used.

As acrylonitrile-butadiene rubber (NBR) that can be preferably used as a thermosetting elastomer, it is possible to use any of low-nitrile NBR having the bound acrylonitrile amount at less than 25%, intermediate-nitrile NBR having the bound acrylonitrile amount at 25% to 31%, intermediate/high-nitrile NBR having the bound acrylonitrile amount at 31% to 36%, high-nitrile NBR having the bound acrylonitrile amount at 36 to 43%, and super-high nitrile NBR having the bound acrylonitrile amount at not less than 43%, provided that they have the bound acrylonitrile amount in the range of 15 to 50%. It is especially preferable to use the intermediate-nitrile NBR, the intermediate/high-nitrile NBR or the high-nitrile NBR.

The same is true of the acrylonitrile-butadiene rubber (NBR) that is used as the material of hydrogenated acrylonitrile-butadiene rubber.

The thermosetting elastomer which contains the acrylonitrile and is used as the rubber component, it is possible to list acrylonitrile-butadiene rubber (hereinafter referred to as NBR), hydrogenated acrylonitrile-butadiene rubber (hereinafter referred to as HNBR), carboxyl-modified acrylonitrile-butadiene rubber, acrylonitrile isoprene rubber, acrylonitrile-butadiene-isoprene copolymer rubber, and liquid nitrile rubber (liquid acrylonitrile-butadiene rubber).

Of the above-described thermosetting elastomers containing the acrylonitrile, it is preferable to select the acrylonitrile-butadiene rubber (NBR), a mixture of the NBR and other rubber component or hydrogenated acrylonitrile-butadiene rubber (HNBR) having residual double bond at not more than 10%. It is especially preferable to use the NBR or the HNBR singly.

When other elastomer is mixed with the NBR, the ratio of the NBR to the entire rubber component is favorably not less than 50 parts by mass and more favorably not less than 70 parts by mass.

As the "other elastomer" that can be used in the present invention, it is possible to list natural rubber (NR), butadiene rubber (BR), styrene-butadiene rubber (SBR), isoprene rubber (IR), butyl rubber (IIR), chloroprene rubber (CR), acrylic rubber (ACM, ANM), epichlorohydrin rubber (ECO), ethylene propylene rubber (EPR), and ethylene-propylene-diene copolymer rubber (EPDM). These elastomers may be used singly or by mixing two or more of them with each other.

When the thermosetting elastomer ("elastomer a") is used by mixing other elastomer ("elastomer b") therewith, the mixing amount of the elastomer a is 90 to 50 parts by mass and preferably 90 to 70 parts by mass for 100 parts by mass which is the total mass of the elastomer component, and the mixing amount of the elastomer b is 10 to 50 parts by mass and preferably 10 to 30 parts by mass for 100 parts by mass which is the total mass of the elastomer component.

The reason the mixing amount of the elastomer a is set to not less than 50 nor more than 90 parts by mass and the mixing amount of the elastomer b is set to not less than 10 nor more than 50 parts by mass is as follows: If the mixing amount of the elastomer a is less than 50 parts by mass and the mixing amount of the elastomer b is more than 50 parts by mass, there is a fear that the cleaning blade of the present invention for use in the image-forming apparatus has a low physical strength. On the other hand, if the mixing amount of the elastomer a is more than 90 parts by mass and the mixing amount of the elastomer b is less than 10 parts by mass, there is a fear that the elastomer b does not display its performance.

It is preferable that the number-average molecular weight of the thermosetting elastomer is not less than 50,000 nor more than 800,000. The number-average molecular weight of the thermosetting elastomer is set to not less than 50,000 for the following reason: If the number-average molecular weight thereof is less than 50,000, the thermosetting elastomer has a low mechanical strength and thus has low wear resistance and durability. The number-average molecular weight of the thermosetting elastomer is set to not more than 800,000 for the following reason: If the number-average molecular weight thereof is more than 800,000, the thermosetting elastomer has a high Mooney viscosity. Thereby there is a fear that the thermosetting elastomer has a low molding processability.

The number-average molecular weight thereof is more favorably not less than 70,000 nor more than 500,000 and most favorably not less than 70,000 nor more than 300,000.

The composition composing the cleaning blade of the present invention for use in the image-forming apparatus may contain components other than the above-described thermosetting elastomer, provided that the composition contains the thermosetting elastomer.

It is preferable that the composition of the present invention contains a filler (B) and a crosslinking agent (C) in addition to the above-described elastomer component (A).

It is preferable that the composition contains 0.1 to 80 parts by mass of the filler (B) for 100 parts by mass of the elastomer component (A). The reason the mixing amount of the filler (B) for 100 parts by mass of the elastomer component (A) is set to 0.1 to 80 parts by mass is as follows: If the mixing amount of the filler (B) is less than 0.1 parts by mass, there is a fear that the elastomer component is not sufficiently reinforced nor sufficiently crosslinked. On the other hand, if the mixing amount of the filler (B) is more than 80 parts by mass, the composition has a very high hardness. Consequently there is a fear that the cleaning blade of the present invention damages a photoreceptor.

It is preferable that the composition contains 0.1 to 30 parts by mass of the crosslinking agent (C) for 100 parts by mass of the elastomer component (A). The reason the mixing amount of the crosslinking agent (C) for 100 parts by mass of the elastomer component (A) is set to 0.1 to 30 parts by mass is as follows: If the mixing amount of the crosslinking agent (C) is less than 0.1 parts by mass, the crosslinking density is low. Thereby there is a fear that the obtained composition does not have the desired property. On the other hand, if the mixing amount of the crosslinking agent (C) is more than 30 parts by mass, the obtained resin composition has a very high hardness owing to an excessive crosslinking reaction. Consequently there is a fear that the cleaning blade of the present invention damages the photoreceptor.

The filler (B) that is used in the present invention includes a co-crosslinking agent, a vulcanization accelerator, a vulcanization-accelerating assistant, an age resistor, a softener, a reinforcing agent, and an additive. These fillers may be used singly or by mixing two or more of them with each other.

The co-crosslinking agent crosslinks itself and reacts with molecules of the thermosetting elastomer and crosslinks them, thus making the entire composition polymeric.

As the co-crosslinking agent, it is possible to use ethylene unsaturated monomers represented by methacrylate ester and metal salts of methacrylic acid or acrylic acid; polyfunctional polymers; and dioximes.

As the ethylene unsaturated monomer, the following substances are listed:

(a) Monocarboxylic acids such as acrylic acid, methacrylic acid, crotonic acid, and the like.

(b) Dicarboxylic acids such as maleic acid, fumaric acid, itaconic acid, and the like.

(c) Ester or anhydride of the above (a) and (b)

(d) Metal salts of the above (a) through (c)

(e) Aliphatic conjugated dienes such as 1,3-butadiene, isoprene, 2-chloro-1,3-butadiene, and the like (f) Aromatic vinyl compounds such as styrene, α-methylstyrene, vinyltoluene, ethyl vinylbenzene, divinylbenzene, and the like (g) Vinyl compounds having a heterocycle such as triallyl isocyanurate, triallyl cyanurate, and vinylpyridine (h) Vinyl cyanide compounds such as (meth)acrylonitrile and α-chloroacrylonitrile; and vinyl ketones such as acrolein, formylstyrol, vinyl methyl ketone, vinyl ethyl ketone, and vinyl butyl ketone.

As the ester of the monocarboxylic acids, the following substances are listed:

alkyl esters of (meth)acrylic acid such as methyl (meth) acrylate, ethyl (meth)acrylate, in-propyl (meth)acrylate, i-propyl (meth)acrylate, n-butyl (meth)acrylate, i-butyl (meth)acrylate, n-pentyl (meth)acrylate, i-pentyl (meth)acrylate, n-hexyl (meth)acrylate, cyclohexyl (meth)acrylate, 2-ethylhexyl (meth)acrylate, octyl (meth)acrylate, i-nonyl (meth)acrylate, tert-butyl cyclohexyl (meth)acrylate, decyl (meth)acrylate, dodecyl (meth)acrylate, hydroxymethyl (meth)acrylate; hydroxyethyl (meth)acrylate amino alkyl esters of (meth)acrylic acid such as aminoethyl acrylate, dimethylaminoethyl acrylate, butylaminoethyl acrylate, and the like;

(meth)acrylate having an aromatic ring such as benzyl (meth)acrylate, benzoyl (meth)acrylate, allyl (meth)acrylate, and the like;

(meth)acrylate having epoxy group such as glycidyl (meth) acrylate, methglycidyl (meth)acrylate, epoxycyclohexyl (meth)acrylate, and the like; and (meth)acrylate having functional group such as N-methylol(meth)acrylamide, γ-(meth)acryloxypropyltrimethoxysilane;

(meth)acrylate having polyfunctional group such as ethylene glycol di(meth)acrylate, trimethylolpropane tri(meth) acrylate, ethylene dimethacrylate (EDMA), polyethylene glycol dimethacrylate, tetrahydrofurfuryl methacrylate, isobutylene ethylene dimethacrylate, and the like.

As the "esters of dicarboxylic acids" of the above (c), half esters such as methyl maleate, methyl itaconate; diallyl phthalate, diallyl itaconate, and the like are listed.

As the "anhydride" of the above-described (c), anhydride of acrylic acid, anhydride of maleic acid, and the like are listed.

As the "metal salts" of the above-described (d), aluminum salts, calcium salts, zinc salts, and magnesium salts of unsaturated carboxylic acids such as acrylic acid, methacrylic acid, maleic acid, and fumaric acid are listed.

As the ethylene unsaturated monomer that can be preferably used in the present invention, the following substances are listed:

methacrylic acid;

higher ester of methacrylic acids such as trimethylolpropane trimethacrylate (TMPT), ethylene dimethacrylate (EDMA), polyethylene glycol dimethacrylate, cyclohexyl methacrylate, allyl methacrylate, tetrahydrofurfuryl methacrylate, and isobutylene ethylene dimethacrylate;

metal salts of methacrylic acid or acrylic acid such as aluminum acrylate, aluminum methacrylate, zinc acrylate, zinc methacrylate, calcium acrylate, calcium methacrylate, magnesium acrylate, magnesium methacrylate, and the like; and triallyl isocyanurate, triallyl cyanurate, diallyl phthalate, diallyl itaconate, vinyl toluene, vinyl pyridine, and divinylbenzene.

As the polyfunctional polymers, those utilizing the functional group of 1,2-polybutadiene are listed. More specifically, Buton 150, Buton 100, polybutadiene R-15, Diene-35, Hystal-B2000, and the like are listed.

As the above-described dioximes, p-quinonedioxime, p,p'-dibenzoyl quinonedioxime, N,N'-m-phenylenebismaleimide are listed.

The mixing amount of the co-crosslinking agent should be large enough to crosslink or vulcanize the elastomer component. Normally the mixing amount of the co-crosslinking agent for 100 parts by mass of the elastomer component is selected in the range of 0.1 to 10 parts by mass.

As the vulcanization accelerator, both inorganic accelerators and organic accelerators can be used.

As the inorganic accelerator, it is possible to use slaked lime, magnesium oxides, titanium oxides, and litharge (PbO).

As the organic accelerator, thiurams, thiazoles, thioureas, dithiocarbamates, guanidines, and sulfeneamides are listed.

As the thiurams, tetramethylthiuram monosulfide, tetramethylthiuram disulfide, tetraethylthiuram disulfide, tetrabutylthiuram disulfide, and dipentamethylenethiuram tetrasulfide are listed.

As the thiazoles, it is possible to list 2-melcaptobenzothiazole, dibenzothiazyl disulfide, N-cyclohexyl benzothiazole, N-cyclohexyl-2-benzothiazolesulfeneamide, N-oxydiethylene-2-benzothiazolesulfeneamide, N-tert-butyl-2-benzothiazolesulfeneamide, and N,N-dicyclohexyl-2-benzothiazolesulfeneamide.

As the thioureas, N,N'-diethylthiourea, ethylenethiourea, and trimethylthiourea are listed.

As the salts of the dithiocarbamates, zinc dimethyl dithiocarbamate, zinc diethyl dithiocarbamate, zinc dibutyl dithiocarbamate, sodium dimethyl dithiocarbamate, sodium diethyl dithiocarbamate, copper dimethyl dithiocarbamate, ferric dimethyl dithiocarbamate (III), selenium diethyl dithiocarbamate, and tellurium diethyl dithiocarbamate are listed.

As the guanidine accelerator, it is possible to list di-o-tolyl guanidine, 1,3-diphenyl guanidine, 1-o-tolylbiguanide, and di-o-tolylbiguanide salts of dicatechol borate.

As the sulfeneamides, N-cyclohexyl-2-benzothiazole sulfeneamide and the like are listed.

The mixing amount of the vulcanization accelerator should be large enough to allow the property of the elastomer component to be sufficiently displayed. Normally the mixing amount of an inorganic vulcanization accelerator for 100 parts by mass of the elastomer component is selected in the range of 0.5 to 15 parts by mass, and an organic vulcanization accelerator for 100 parts by mass of the elastomer component is selected in the range of 0.5 to 3 parts by mass The vulcanization-accelerating assistant that is used in the present invention includes metal oxides such as zinc oxide; fatty acids such as stearic acid, oleic acid, cotton seed fatty acid; zinc carbonate; and known vulcanization-accelerating assistants. The metal oxides such as zinc oxide also serve as the reinforcing agent described below.

The mixing amount of the vulcanization-accelerating assistant should be large enough to allow the property of the elastomer component to be sufficiently displayed. Normally the mixing amount of the vulcanization-accelerating assistant for 100 parts by mass of the elastomer component is selected in the range of 0.5 to 10 parts by mass.

As the age resistor, amines, imidazoles, and phenols are listed.

As the amines, styrenated diphenylamine, dialkyldiphenylamine, phenyl-α-naphthylamine, N,N'-diphenyl-p-phenylenediamine, N-phenyl-N'-isopropyl-p-phenylenediamine, N,N'-di-2-naphthyl-p-phenylenediamine, and N,N'-di-6-naphthyl-p-phenylenediamine are listed.

The imidazoles that are used in the present invention includes 2-melcaptobenzoimidazole, zinc salts of 2-melcaptobenzoimidazole, and 2-melcaptomethylbenzoimidazole.

The phenol that is used in the present invention includes 2,5-di-tert-butyl hydroquinone, 2,5-di-tert-amyl hydroquinone, 2,2'-methylene bis (4-methyl-6-tert-butyl phenol), 2,2'-methylene bis (4-ethyl-6-tert-butyl phenol), 2,6-di-tert-butyl-4-methyl phenol, 4,4'-thiobis (6-tert-butyl-3-methyl phenol), styrenated methyl phenol, 4,4'-butylidene bis (3-methyl-6-tert-butyl phenol), mono (α-methylbenzyl) phenol, di (α-methylbenzyl) phenol, tri (α-methylbenzyl) phenol, and 1,1-bis(4-hydroxylphenyl) cyclohexane.

As the age resistor, it is possible to use poly (2,2,4-trimethyl-1,2-dihidroquinoline), 6-ethoxy-1,2-dihydro-2,2,4-trimethylquinoline, 1-(N-phenylamino)-naphthalene, nickel dibutyl dithiocarbamate, tris(nonyphenyl) phosphite, and dilauryl thiodipropionate, distearyl thiodipropionate.

The mixing amount of the age resistor should be large enough to allow the property of the elastomer component to be sufficiently displayed. Normally the mixing amount of the age resistor for 100 parts by mass of the elastomer component is selected in the range of 1 to 10 parts by mass.

As the softener, it is preferable to use softeners for use in rubber. More specifically, it is possible to use derivatives of phthalic acid, isophthalic acid, adipic acid, sebacic acid, benzoic acid, and phosphoric acid.

More specifically, it is possible to list dioctyl phthalate (DOP) such as dibutyl phthalate (DBP) and di-(2-ethylhexyl) phthalate; di-iso-octyl phthalate (DIOP), di-(2-ethylhexyl) sebacate, polyester adipate, dibutyl diglycol adipate, di(butoxyethoxyethyl) adipate, iso-octyl-tall oil fatty ester, tributyl phosphate (TBP), tributoxyethyl phosphate (TBEP), tricresyl phosphate (TCP), cresyl diphenyl phosphate (CDP), and diphenyl alkane.

The mixing amount of the softener should be large enough to allow the property of the elastomer component to be sufficiently displayed. Normally the mixing amount of the softener for 100 parts by mass of the elastomer component is selected in the range of 0.5 to 5 parts by mass.

As the reinforcing agent, in addition to carbon black mainly used as a filler for guiding an interaction of the carbon black with the elastomer, it is possible to use inorganic reinforcing agents such as white carbon (silica filler such as dry silica or wet silica, silicate such as magnesium silicate), calcium carbonate, magnesium carbonate, magnesium silicate, clay (aluminum silicate, silane-modified clay, and talc; and organic reinforcing agents such as coumarone and indene resin, phenol resin, high-styrene resin, and wood meal.

It is preferable to use the carbon black from the standpoint of the reinforcing effect, the cost, and the dispersibility, and the wear resistance.

As the carbon black, it is preferable to use SAF carbon (average particle diameter: 18 to 22 μm), SAF-HS carbon (average particle diameter: about 20 μm), ISAF carbon (average particle diameter: 19 to 29 μm), N-339 carbon (average particle diameter: about 24 μm), ISAF-LS carbon (average particle diameter: 21 to 24 μm), I-ISAF-HS carbon (average particle diameter: 21 to 31 μm), HAF carbon (average particle diameter: about 26 to 30 μm), HAF-HS carbon (average particle diameter: 22 to 30 μm), N-351 carbon (average particle diameter: about 29 μm), HAF-LS carbon (average particle diameter: about 25 to 29 μm), LI-HAF carbon (average particle diameter: about 29 μm), MAF carbon (average particle diameter: 30 to 35 μm), FEF carbon (average particle diameter: about 40 to 52 μm), SRF carbon (average particle diameter: 58 to 94 μm), SRF-LM carbon, and GPF carbon (average particle diameter: 49 to 84 μm) are listed. It is especially preferable to use the FEF carbon, the ISAF carbon, the SAF carbon, and the HAF carbon.

The mixing amount of the reinforcing agent should be large enough to allow the property of the elastomer component to be sufficiently displayed. Normally the mixing amount of the reinforcing agent for 100 parts by mass of the elastomer component is selected in the range of 5 to 100 parts by mass.

As the additive, amide compounds, metal salts of fatty acids, and wax are listed.

As the amide compounds, aliphatic amide compounds and aromatic amide compounds are listed. It is preferable to use the aliphatic amide compounds. As fatty acids in the aliphatic amide compounds, oleic acid, stearic acid, erucic acid, caproic acid, caprilic acid, lauryl acid, myristic acid, palmitic acid, arachidic acid, behenic acid, palmitoleic acid, eicosane acid, erucic acid, elaidic acid, trans-11-eicosane acid, trans-13-docosane acid, linolic acid, linolenic acid, and ricinoleic acid are listed. Aliphatic amide compounds such as oleamide, stearamide, and erucamide are preferable.

Regarding the metal salts of fatty acids, lauryl acid, stearic acid, palmitic acid, myristic acid, and oleic acid are listed as the fatty acid, and zinc, iron, calcium, aluminum, lithium, magnesium, strontium, barium, cerium, titanium, zirconium, lead, and manganese are listed as the metal.

As the wax, paraffin wax, montan wax, amide wax are listed.

The mixing amount of the additive should be large enough to allow the property of the elastomer component to be sufficiently displayed. Normally the mixing amount of the additive for 100 parts by mass of the elastomer component is selected in the range of 1 to 10 parts by mass.

As the crosslinking agent (C) that is used in the present invention, sulfur, organic sulfur-containing compounds, organic peroxides, heat-resistant crosslinking agents, and resin crosslinking agents are listed.

In addition to pulverized collected sulfur normally used, it is also possible to use dispersibility-improved surface-treated sulfur. It is also possible to use insoluble sulfur to prevent blooming of sulfur from unvulcanized rubber.

As the organic sulfur-containing compounds, N,N'-dithiobismorpholine and the like are listed.

As the organic peroxides, it is possible to list benzoyl peroxide, 1,1-di-(tert-butyl peroxy)-3,3,5-trimethylcyclohexane, 2,5-dimethyl-2,5-di-(benzoyl peroxy)hexane, 2,5-dimethyl-2,5-di-(benzoyl peroxy)-3-hexene, 2,5-dimethyl-2,5-di-(tert-butyl peroxy)hexane, di-tert-butyl peroxy-diisopropylbenzene, di-tert-butyl peroxide, di-tert-butylperoxybenzoate, dicumyl peroxide, tert-butyl cumyl peroxide, 2,5-dimethyl-2,5-di-(tert-butyl peroxy)-3-hexene, 1,3-bis(tert-butyl peroxyisopropyl)benzene, n-butyl-4,4-bis (tert-butyl peroxy)valerate, p-chlorobenzoyl peroxide, 2,4-dichlorobenzoyl peroxide, tert-butyl peroxyisopropyl carbonate, diacetyl peroxide, lauroyl peroxide.

The heat-resistant crosslinking agent which is used in the present invention includes 1,3-bis(citraconicimide methyl) benzene, hexamethylene-1,6-sodium bisthiosulfate-dihydrate, 1,6-bis(dibenzylthiocarbamoyl disulfide)hexane.

As the resin crosslinking agent, alkylphenol resin or bromized alkylphenol formaldehyde resin such as Tackyroll 201 (produced by Taoka Kagaku Kogyo Inc.), Tackyroll 250-III (produced by Taoka Kagaku Kogyo Inc.), and Hitanol 2501 (produced by Hitachi Kasei Kogyo Inc.) are listed.

The composition composing the cleaning blade of the present invention for use in the image-forming apparatus is obtained by mixing the components thereof with one another by using a known rubber kneading apparatus such as a single-axis extruder, a 1.5-axis extruder, a biaxial extruder, an open roll, a kneader, a Banbury mixer, and a heated roller.

The order of mixing the components is not specifically limited, but it is possible to supply the components to the kneading apparatus all together or supply a part of the components to the kneading apparatus, knead them to obtain a mixture, add remaining components to the mixture, and knead the mixture and the remaining components together. It is preferable to carry out a method of kneading the elastomer component (A) and the filler (B) to obtain a mixture, add the crosslinking agent (C) to the mixture, and thereafter knead the mixture and the crosslinking agent (C) together.

The cleaning blade of the present invention for use in the image-forming apparatus is obtained by molding the composition obtained in the above-described manner by carrying out a known molding method such as compression molding or injection molding.

It is preferable that the cleaning blade of the present invention for use in the image-forming apparatus has the following properties:

It is favorable that the cleaning blade has a hardness of 60 to 90 in JIS-A. If the JIS-A hardness is less than 60, pressure is not applied to the tip of the cleaning blade. Consequently toner cannot be removed from the photoreceptor. On the other hand, if the JIS-A hardness is more than 90, the cleaning blade damages the photoreceptor. It is favorable that the cleaning blade has a hardness of 70 to 85 in JIS-A.

It is favorable that the cleaning blade has a tensile strength not less than 6.0 MPa. If the cleaning blade has a tensile strength less than 6.0 MPa, the cleaning blade is frail and is thus worn to a high extent. The tensile strength is more favorably in the range of 6.0 to 30 MPa and most favorably in the range of 9.0 to 30 MPa.

The modulus of repulsion elasticity of the cleaning blade is favorably in the range of 15 to 70%. If the modulus of repulsion elasticity thereof is less than 15%, the cleaning blade does not have a repulsive force for removing the toner from the photoreceptor and is thus incapable of removing the toner therefrom. If the modulus of repulsion elasticity is more than 70%, the cleaning blade chatters to a high extent and is thus incapable of removing the toner. The modulus of repulsion elasticity of the cleaning blade is more favorably in the range of 15 to 60%.

The glass transition temperature of the cleaning blade is favorably not more than 10° C. If the glass transition temperature thereof is more than 10° C., the cleaning blade has a low cleaning performance at a low temperature and a low humidity. The glass transition temperature of the cleaning blade is more favorably in the range of −20 to 10° C. and most favorably in the range of −20 to 6° C.

The effect of the present invention is described below. By using the thermosetting elastomer having the bound acrylonitrile amount in the specified range, the cleaning blade of the present invention has an improved mechanical strength. Therefore it is possible to prevent the occurrence of the reversal phenomenon of the edge of the cleaning blade in the region where a small amount of residual toner is present. It is also possible to prevent the cleaning blade from making noises at a high temperature and a high humidity, and from being pressed at a low force against the photoreceptor and from generating a chatter phenomenon at a low temperature and a low humidity. Consequently it is possible to improve the cleaning performance at not only normal temperatures but also a low temperature.

Regarding the composition composing the cleaning blade of the present invention, the filler and the crosslinking agent are added to the thermosetting elastomer having the bound acrylonitrile amount in the specified range. Therefore it is possible to make various properties by altering the mixing ratio among the elastomer component, the filler, and the crosslinking agent.

For example, by adding the filler to the thermosetting elastomer, it is possible to make the thermosetting elastomer and/or the filler bleed on the surface of the cleaning blade and adjust the coefficient of friction between the cleaning blade and the photoreceptor to a low value. Therefore unlike the conventional cleaning blade having a large coefficient of friction, the cleaning blade of the present invention can be prevented from generating the reversal phenomenon of the edge thereof. Further it is possible to restrain the cleaning blade from generating the noise-making phenomenon which occurs owing to the vibration caused by the sliding contact between the cleaning blade and the photoreceptor at a high temperature and a high humidity. It is also possible to restrain the cleaning blade from generating the chatter phenomenon which occurs owing to the vibration caused by the sliding contact between the cleaning blade and the photoreceptor at a low temperature and a low humidity. By controlling the degree of the elasticity of the resin composition of the cleaning blade in dependence on a mixing ratio among the components of the resin composition, it is possible to press the cleaning blade against the photoreceptor at a large force and securely remove residual spherical fine toner. Thus the cleaning blade has a high cleaning performance suitable for very fine spherical toner used to form a high-quality image.

The cleaning blade of the present invention can be produced by merely molding the composition containing the thermosetting elastomer as specified above. Therefore it is unnecessary to perform specific processing of the surface of the cleaning blade unlike the invention described in the patent document 1. Thus it is possible to simplify the manufacturing process and facilitate the management of the manufacturing process and hence manufacture the cleaning blade at a low cost. Further it is unnecessary to provide the image-forming apparatus with an apparatus for applying a lubricant to the surface of the photoreceptor. Thus it is possible to incorporate the cleaning blade in the image-forming apparatus as it is and securely make the image-forming apparatus compact. Hence it is possible to manufacture the cleaning blade at a low cost.

DETAILED DESCRIPTION OF THE PREFERRED EMBODIMENTS

The embodiment of a cleaning blade of the present invention and an image-forming apparatus on which the cleaning blade is mounted will be described below with reference to the drawings.

Figure 1:
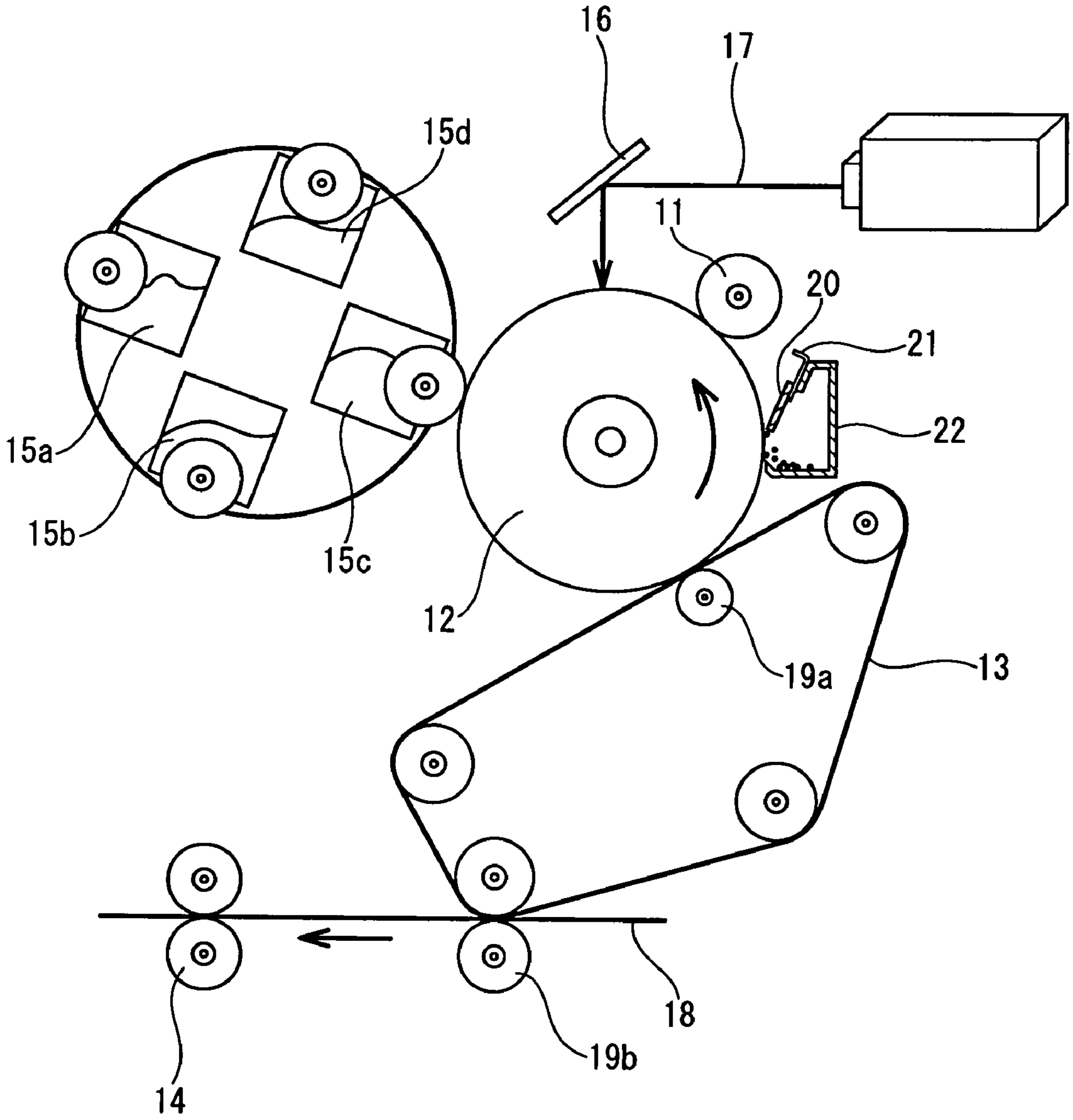
FIG. 1 is an illustrative view showing a color image-forming apparatus on which the cleaning blade of the present invention is mounted.

As shown in FIG. 1, a cleaning blade 20 of the present invention is bonded to a supporting member 21 with an adhesive agent. The supporting member 21 is composed of a rigid metal, an elastic metal, plastic or ceramic. It is favorable that the supporting member 21 is made of metal and more favorable that it is made by Chrome Free SECC.

As the adhesive agent for bonding the cleaning blade 20 to the supporting member 21, a polyamide or polyurethane hot-melt adhesive agent and an epoxy or phenol adhesive agent are used. It is preferable to use the hot-melt adhesive agent.

The image-forming apparatus shown in FIG. 1 has a charging roller 11, a photoreceptor 12, an intermediate transfer belt 13, a fixing roller 14, toner 15*a*, 15*b*, 15*c*, and 15*d*, a mirror 16, a laser 17, an object 18 to be transferred, a primary transfer roller 19*a*, a secondary transfer roller 19*b*, and a toner collection box 22.

The color image-forming apparatus forms an image in processes described below:

Initially, the photoreceptor 12 rotates in the direction shown with the arrow of FIG. 1. After the photoreceptor 12 is charged by the charging roller 11, the laser 17 exposes a non-imaging portion of the photoreceptor 12 via the mirror 16. As a result, the non-imaging portion is destaticized. The portion of the photoreceptor 12 corresponding to an imaging portion is charged. Thereafter the toner 15*a* is supplied to the photoreceptor 12 and attaches to the charged imaging portion to form a first-color toner image. The toner image is transferred to the intermediate transfer belt 13 via the primary transfer roller 19*a*. In the same manner, a color toner image of each of the other toners 15*b* to 15*d* formed on the photoreceptor 12. is transferred to the intermediate transfer belt 13. A full-color image composed of the four-color toners 15*a* through 15*d* is formed on the intermediate transfer belt 13. The full-color image is transferred to the to-be-transferred material (normally, paper) 18 via the secondary transfer roller 19*b*. When the to-be-transferred material 18 passes between a pair of the fixing rollers 14 heated to a predetermined temperature, the full-color image is fixed to the surface thereof.

In the above-described processes, to sequentially copy the image of an original document on a plurality of recording paper, toner which has not been transferred to the intermediate transfer belt 13 but has remained on the photoreceptor 12 is removed from the surface of the photoreceptor 12 by rubbing the photoreceptor 12 with the cleaning blade 20 pressed against the surface of the photoreceptor 12 and is collected in the toner collection box 22.

The cleaning blade 20 of the present invention is composed of a composition consisting of essentially an elastomer component (A), a filler (B), and a crosslinking agent (C).

As the elastomer component (A), NBR having a bound acrylonitrile amount at 28 to 40% and a number-average molecular weight at not less than 70,000 nor more than 200,000 is used.

The resin composition contains the filler (B) at 1 to 80 parts by mass, favorably at 10 to 80 parts by mass, and more favorably at 30 to 75 parts by mass for 100 parts by mass of the elastomer component (A).

As the filler (B), a co-crosslinking agent, a vulcanization accelerator, a vulcanization-accelerating assistant, a reinforcing agent, and an additive are used.

It is preferable to use methacrylic acid as the co-crosslinking agent. The resin composition contains the methacrylic acid at 5 to 10 parts by mass and favorably at 7 to 10 parts by mass for 100 parts by mass of the elastomer component (A).

As the vulcanization accelerator, it is preferable to use magnesium oxide which is an inorganic accelerator or thiazoles or thiurams which are organic accelerators. As the thiazoles, dibenzothiazyl disulfide is most favorable. As the thiurams, tetramethylthiuram monosulfide is most favorable.

The mixing amount of the magnesium oxide is favorably 5 to 10 parts by mass and more favorably 7 to 10 parts by mass for 100 parts by mass of the elastomer component (A). The mixing amount of the thiazoles or the thiurams is favorably 0.5 to 3 parts by mass for 100 parts by mass of the elastomer component (A).

It is preferable to use zinc oxide or stearic acid as the vulcanization-accelerating assistant. The mixing amount of the vulcanization-accelerating assistant is favorably 1 to 10 parts by mass and more favorably 2 to 8 parts by mass for 100 parts by mass of the elastomer component (A). When two or more vulcanization-accelerating assistants are used in combination, the mixing amount of one of the vulcanization-accelerating assistants is favorably 0.5 to 5 parts by mass for 100 parts by mass of the elastomer component (A).

As the reinforcing agent, it is favorable to use carbon black and more favorable to use ISAF carbon. The mixing amount of the carbon black is favorably 10 to 80 parts by mass and more favorably 10 to 60 parts by mass for 100 parts by mass of the elastomer component (A).

As the additive, it is preferable to use metal salts of fatty acid. As the metal salts of fatty acid, it is favorable to use metal salts of stearic acid and more favorable to use zinc stearate. The mixing amount of the additive is favorably 1 to 20 parts by mass and more favorably 5 to 15 parts by mass for 100 parts by mass of the elastomer component (A).

The filler (B) may be used singly or by mixing two or more of them. The following combinations are favorable: the combination of the co-crosslinking agent, the vulcanization accelerator, and the reinforcing agent; the combination of the co-crosslinking agent, the vulcanization accelerator, the reinforcing agent, and the additive; the combination of the vulcanization accelerator, the vulcanization-accelerating assistant, and reinforcing agent; the combination of the vulcanization accelerator, the vulcanization-accelerating assistant, the reinforcing agent, and the additive; and the combination of the vulcanization-accelerating assistant and the reinforcing agent. The following combinations are more favorable: the combination of methacrylic acid, magnesium oxide, and carbon black; the combination of methacrylic acid, magnesium oxide, carbon black, and metal salts of stearic acid; and the combination of thiazoles and/or thiurams, zinc oxide, the stearic acid, carbon black, and metal salts of the stearic acid. Of these combinations, the combination containing the metal salts of fatty acid is most favorable.

As the crosslinking agent (C), sulfur or organic peroxides are used. These crosslinking agents may be used singly or in combination of two or more of them.

It is preferable to use powder sulfur as the above-described sulfur. The mixing amount of the sulfur is favorably 0.5 to 5 parts by mass and more favorably 1 to 3 parts by mass for 100 parts by mass of the elastomer component (A). When the sulfur is used as the crosslinking agent (C), it is preferable to use the vulcanization accelerator and the vulcanization-accelerating assistant as the filler (B).

It is preferable to use dicumyl peroxide as the organic peroxide. The mixing amount of the organic peroxide is favorably 0.5 to 10 parts by mass and more favorably one to six parts by mass for 100 parts by mass of the elastomer component (A). When the organic peroxide is used as the crosslinking agent (C), it is preferable to use the co-crosslinking agent as the filler (B).

The cleaning blade of the present invention is manufactured as described below:

Initially the elastomer component (A) and the filler (B) are kneaded at 80 to 120° C. for five to six minutes with the kneading apparatus such as the single-axis extruder, the 1.5-axis extruder, the biaxial extruder, the open roll, the kneader, the Banbury mixer, and the heated roller. If the kneading temperature is less than 80° C. and the kneading period of time is less than five minutes, the elastomer component (A) is not sufficiently plasticized, and kneading is insufficiently performed. If the kneading temperature is more than 120° C. and the kneading period of time is more than six minutes, there is a fear that the crosslinking agent (C) is decomposed.

After the crosslinking agent (C) is added to the obtained mixture, they are kneaded at 80 to 90° C. for five to six minutes by using the kneading apparatus. If the kneading temperature is less than 80° C. and the kneading period of time is less than five minutes, the mixture is not sufficiently plasticized, and kneading is insufficiently performed. If the kneading temperature is more than 90° C. and the kneading period of time is more than six minutes, there is a fear that the crosslinking agent (C) is decomposed.

The composition obtained by carrying out the above-described method is molded to obtain the cleaning blade 20 of the present invention.

It is preferable to mold and process the composition into the rectangular cleaning blade 20 having a thickness of 1 to 3 mm, a width of 10 to 40 mm, and a length of 200 to 500 mm.

The molding method is not specifically limited but a known method such as the injection molding method or the compression molding can be used. More specifically, press vulcanization is performed at 155 to 175° C. for 10 to 30 minutes, with the composition set in a die. If the vulcanizing temperature is less than 155° C. and the vulcanizing period of time is less than 10 minutes, the composition is not sufficiently vulcanized. If the vulcanizing temperature is more than 175° C. and the vulcanizing period of time is more than 30 minutes, there is a fear that the rubber burns.

The cleaning blade 20 obtained by carrying out the above-described method has a hardness of 60 to 90 in JIS-A and preferably 70 to 85 in JIS-A; a tensile strength of 9.0 to 35 MPa and preferably 9.0 to 25 MPa; a modulus of repulsion elasticity of 15 to 70% and preferably 15 to 60%; and a glass transition temperature of −20 to 10° C and preferably −20 to 6° C.

Because the cleaning blade 20 of the present invention has the above-described properties, the cleaning blade 20 did not generate the chattering phenomenon in the test conducted in the examples which will be described in detail below. Further the cleaning blade 20 is capable of securely scraping off all toner at a low temperature as well as a normal temperature.

EXAMPLES

Examples 1 through 4 and Comparison Examples 1, 2

After the mixing amount of each of the elastomer component (A) and the filler (B) shown in table 1 was measured, the elastomer component (A) and the filler (B) were supplied to a rubber kneading apparatus such as a biaxial extruder, an open roll, a Banbury mixer or a kneader. Thereafter they were kneaded for five to six minutes while they were being heated at 80 to 120° C.

The obtained mixture and the crosslinking agent (C) whose mixing amount is shown in table 1 were supplied to the rubber kneading apparatus such as the open roll, the Banbury mixer or the kneader, and were then kneaded for five to six minutes while they were being heated at 80 to 90° C.

After the obtained rubber composition was set in a die, it was press-vulcanized at 155 to 175° C. for 10 to 30 minutes to obtain a sheet having a thickness of 2 mm and a compressed ball (molded base material) having a diameter of ϕ27.5 mm a thickness of 12 mm.

After a cleaning blade having a width of 27 mm and a length of 320 mm was cut out of the sheet having the thickness of 2 mm, the cleaning blade was bonded to a supporting member produced by Chrome Free SECC, with hot-melt (produced by Diabond Inc.). The central portion of the sheet was cut to obtain a cleaning member.

(2) Tensile strength: Dumbbell specimens No. 3 were punched out of the prepared sheet having the thickness of 2 mm to measure the tensile strength thereof at a pulling rate of 500 mm/minute in accordance with JIS K 6251.

(3) Modulus of repulsion elasticity: The modulus of repulsion elasticity of the prepared compressed ball was measured at 23° C. in accordance with JIS K 6255 (Lubke method).

(4) Glass transition temperature Tg: After specimens having a width of 5×40 mm were prepared from the sheet having the thickness of 2 mm, tan δ was measured by using a viscoelasticity spectrometer ("VR-7110" produced by Uejima Seisakusho). The peak of tan δ was set as the glass transition temperature Tg. A sine wave was measured in a pulling mode at a frequency of 10 Hz.

TABLE 1

| | | Example 1 | Example 2 | Example 3 | Example 4 | Comparison Example 1 | Comparison Example 2 |
|---|---|---|---|---|---|---|---|
| Component A | NBR | 100 | 100 | 100 | 100 | 100 | 100 |
| Component B | Carbon black | 15 | 15 | 50 | 50 | 15 | 15 |
| | Magnesium oxide | 10 | 10 | | | 10 | 10 |
| | Methacrylic acid | 10 | 10 | | | 10 | 10 |
| | Zinc oxide | | | 5 | 5 | | |
| | Stearic acid | | | 1 | 1 | | |
| | Zinc stearate | 10 | 10 | 10 | 10 | | |
| | Vulcanization accelerator A | | | 1.5 | 1.5 | | |
| | Vulcanization accelerator B | | | 0.5 | 0.5 | | |
| Component C | Sulfur | | | 1.5 | 1.5 | | |
| | Organic peroxide | 3 | 3 | | | 3 | 3 |
| Property of component A | Bound acrylonitrile amount (%) | 28 | 39 | 28 | 39 | 14 | 52 |
| | Number-average molecular weight ($\times 10^4$) | 7.6 | 15.0 | 7.6 | 15.0 | 4.5 | 4.8 |
| Hardness (Type-A) | | 81 | 75 | 78 | 82 | 95 | 64 |
| Tensile strength (MPa) | | 9.8 | 18.9 | 22.5 | 19.5 | 4.5 | 23.4 |
| Modulus of repulsion elasticity (%) | | 50 | 38 | 38 | 17 | 63 | 19 |
| Glass transition temperature Tg (° C.) | | −10 | 2 | −13 | 6 | −25 | 23 |
| Chatter | | ◎ | ○ | ◎ | ○ | X | X |
| Cleaning performance at a low temperature | | ◎ | ○ | ◎ | ○ | ○ | X |
| Cleaning performance at a normal temperature | | ○ | ○ | ○ | ○ | Δ | X |

Of all the components shown in table 1, the following products were used as the components described below:

NBR

Acrylonitrile amount 28%: Nipol DN2850 produced by Nippon Zeon Inc.

Acrylonitrile amount 39%: Perbunan NT3965 produced by Bayer Polymer Inc.

Acrylonitrile amount 15% and 52% (comparison examples 1, 2): Product made on experimental basis by JSR Carbon black: "Sheast ISAF" produced by Tokai Carbon Inc.

Stearic acid: "Tsubaki" produced by Nippon Yushi Inc.

Zinc stearate: "ZINC STEARATE" produced by Nippon Yushi Inc.

Vulcanization accelerator A: Dibenzothiazyl disulfide ("Knockseller DM" produced by Ouchi Shinko Kagaku Kogyo Inc.)

Vulcanization accelerator B: Tetramethylthiuram monosulfide ("Knockseller TS" produced by Ouchi Shinko Kagaku Kogyo Inc.)

Sulfur: Powder sulfur (produced by Tsurumi Kagaku Inc.)

Organic peroxide: Dicumyl peroxide ("Percumyl D" produced by Nippon Yushi Inc.)

The properties (hardness, tensile strength, modulus of repulsion elasticity, glass transition temperature Tg) shown in table 1 were measured by the following methods:

(1) Hardness: The hardness of the prepared compressed ball was measured in accordance with JIS K 6253 (type A).

The chatter phenomenon of the cleaning blade and the cleaning performance thereof were evaluated by the following method.

Figure 2:
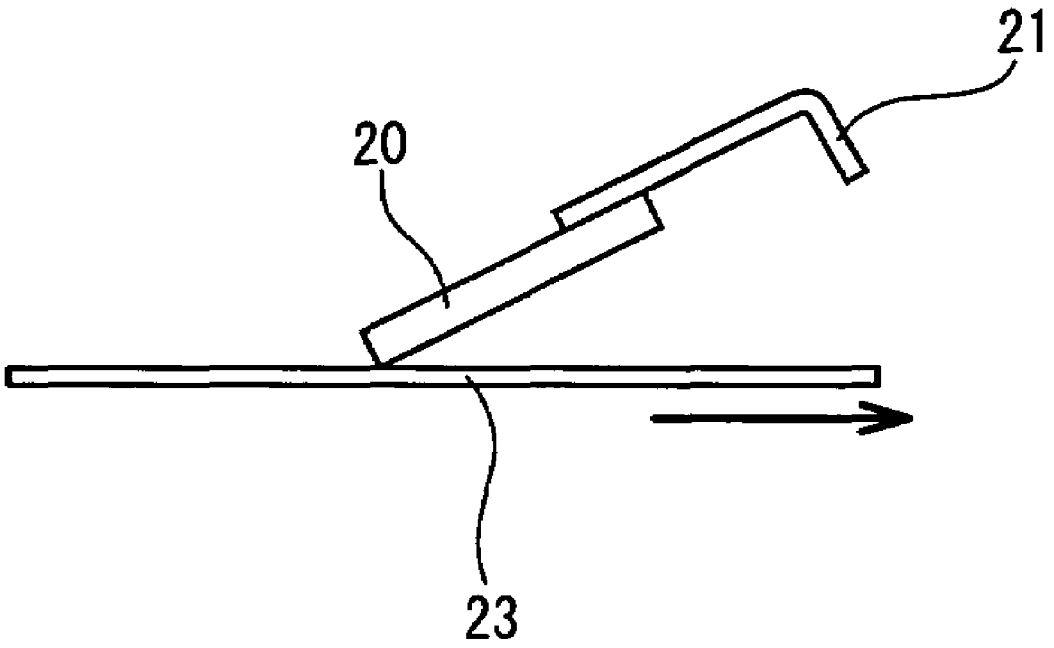
FIG. 2 shows a method of examining the performance of cleaning blades of examples of the present invention and comparison examples.

As shown in FIG. 2, polymerized toner (commercially available toner taken out from a commercially available printer produced by Canon) whose particles have a diameter of 10 μm was attached to a horizontally placed glass plate 23 to which OPC (Organic Photo Conductor produced by the present applicant) was applied. The OPC-applied glass plate 23 was moved at 200 mm/second, with the cleaning blade 20 of each of the examples and the comparison examples held at an angle of 20 to 40 degrees to the OPC-applied glass plate 23 to observe whether the chatter phenomenon occurred and a toner-scraped state. The test was conducted at a temperature of 23° C. and a humidity of 55%. The cleaning performance was examined at a low temperature of 10° C. and a low humidity of 15%.

Specimens which did not chatter were marked by ○. Specimens which chattered to a low extent were marked by Δ. Specimens which chattered to a very high extent were marked by X.

Regarding the cleaning performance, specimens which completely scraped off all toner were marked by ◎. Specimens which scraped off toner were marked by ○. Specimens which left a small amount of toner on the glass plate 23 were marked by Δ. Specimens which left toner on the glass plate 23 to such a high extent that toner could be observed visually were marked by X.

The cleaning blade of the comparison example 1 had a low glass transition temperature. Thus the cleaning blade was excellent in its cleaning performance at a low temperature. But it had a low mechanical strength because it had a small bound acrylonitrile amount. Consequently it chattered and thereby had an inferior cleaning performance at normal temperatures.

The cleaning blade of the comparison example 2 had a high glass transition temperature because it had a large bound acrylonitrile amount. The cleaning blade has an inferior cleaning performance at a low temperature.

The cleaning blades of the examples did not have the problems which occur in the cleaning blades of the comparison examples. More specifically, the cleaning blades of the examples did not chatter and displayed excellent cleaning performance at normal and low temperatures.

What is claimed is:

1. A cleaning blade for removing a toner from the surface of a photoreceptor, in an image-forming apparatus, by being pressed against the surface of the photoreceptor, said cleaning, blade having a rectangular configuration with a thickness of 1 to 3 mm. a width of 10 to 40 mm and a length of 200 to 500 mm which comprises a molded resin composition containing a rubber component consisting of an acrylonitrile-butadiene rubber having a bound acrylonitrile amount of 28 to 39% and a number-average molecular weight thereof of not less than 50,000, 1 to 20 parts by mass of zinc stearate and magnesium oxide as a filler per 100 parts by mass of said rubber component, said zinc stearate and magnesium oxide being present in substantially equal amounts, and 0.1 to 30 parts by mass of a crosslinking agent per 100 parts by mass of said rubber component, said cleaning blade having a JIS-A hardness of 60 to 90, a tensile strength of not less than 6.0 MPa and a modulus of repulsion elasticity of 15 to 70%.

2. The cleaning blade of claim 1, wherein a number-average molecular weight of said acrylonitrile-butadiene rubber is 50,000 to 800,000.

* * * * *